Feb. 24, 1931.  K. M. HAMILTON  1,794,173
CAR TRUCK
Filed July 18, 1927   2 Sheets-Sheet 1

Inventor
Karl M. Hamilton
By George I. Haight Atty.

Feb. 24, 1931.  K. M. HAMILTON  1,794,173
CAR TRUCK
Filed July 18, 1927   2 Sheets-Sheet 2
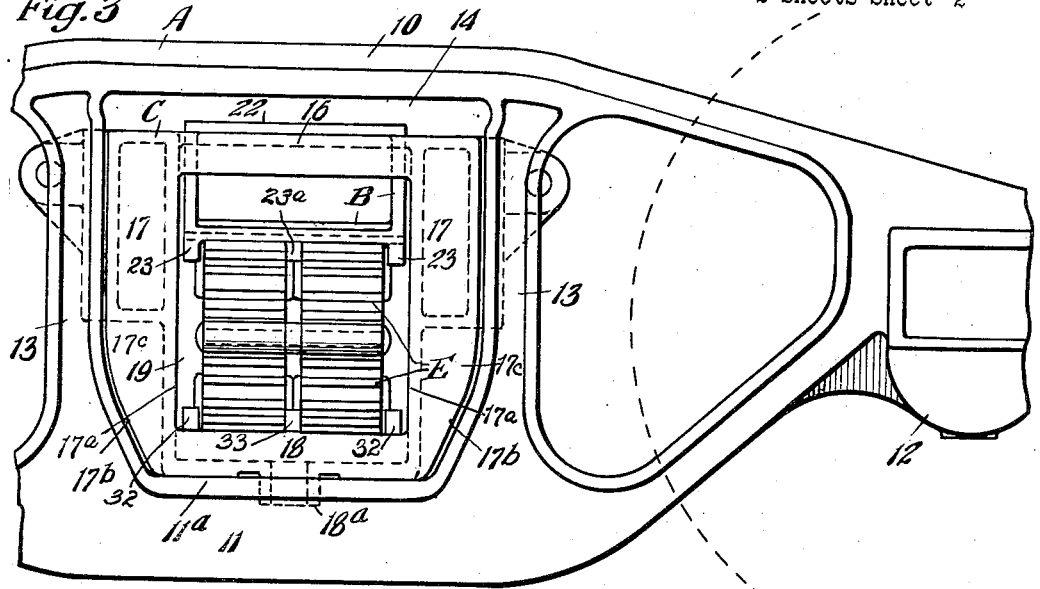
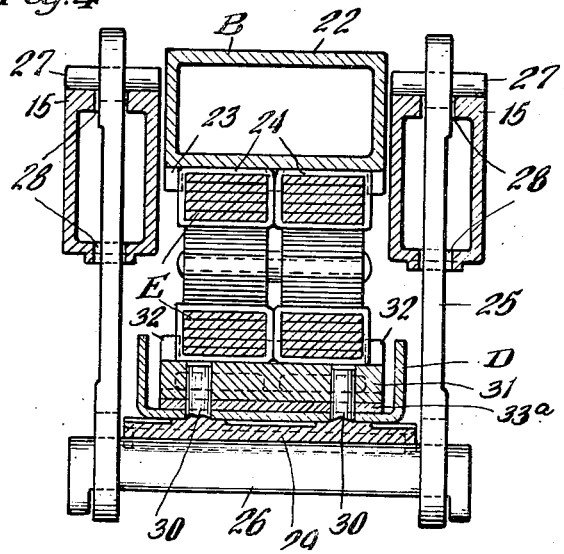
Inventor
Karl M. Hamilton
By George J. Haight
Atty.

Patented Feb. 24, 1931

1,794,173

UNITED STATES PATENT OFFICE

KARL M. HAMILTON, OF CHICAGO, ILLINOIS, ASSIGNOR TO THE BETTENDORF COMPANY, OF BETTENDORF, IOWA, A CORPORATION OF IOWA

CAR TRUCK

Application filed July 18, 1927. Serial No. 206,569.

This invention relates to improvements in car trucks.

An object of my invention is to provide an efficient, strong and durable truck and more particularly a truck of the swing motion type with particular adaptation to service on caboose cars, although not limited thereto.

Another object of my invention is to provide a car truck of the type above indicated wherein the transom consists of an integral cast structure having an interlocking connection at the ends thereof with the side frames, the bolster being supported from the transom casting to provide for the side or lateral motion.

Other objects of my invention are to provide, in a car truck, simple means for adjusting the height of the springs which support the bolster to compensate for set and simple expedients for maintaining the elliptical springs used with my improvements in proper alignment.

Figure 1:
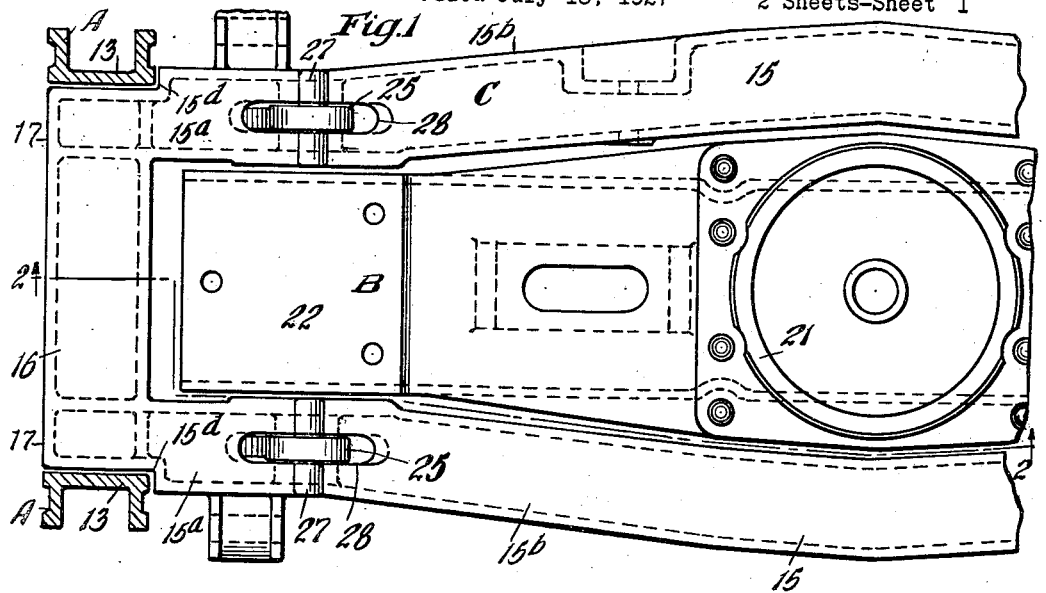
Figure 2:
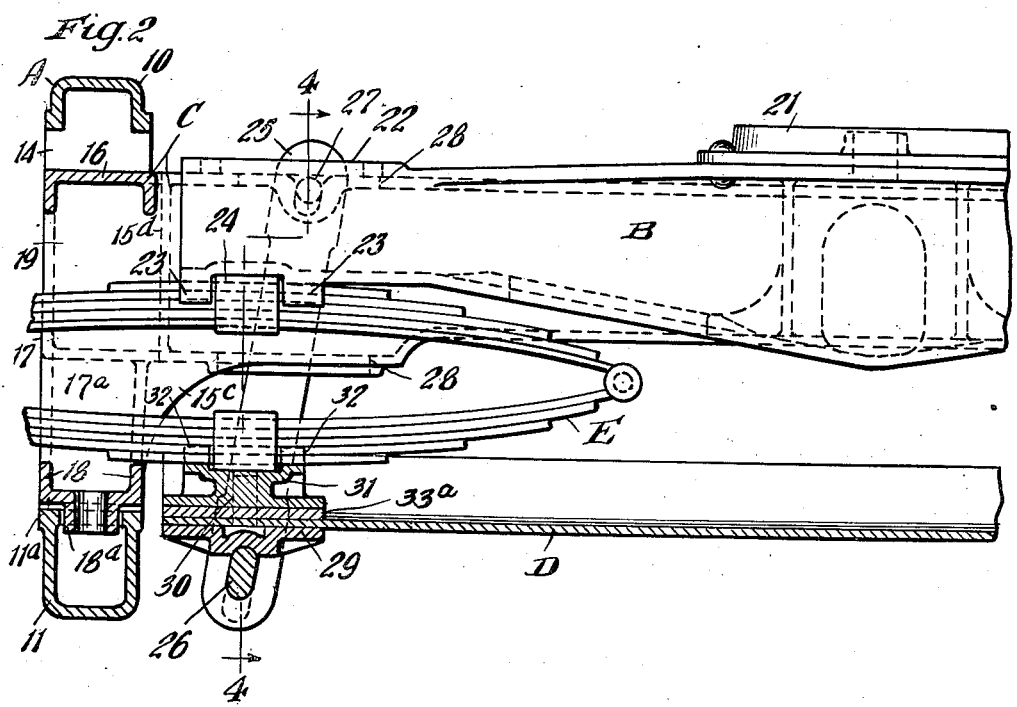

In the drawings forming a part of this specification, Figure 1 is a top plan view of a portion of a truck showing my improvements applied thereto. In this figure, the columns of one of the side frames are shown in section. Figure 2 is a vertical, sectional view taken transversely of the truck and corresponding approximately to the line 2—2 of Figure 1. Figure 3 is a side elevation of a truck having my improvements embodied therein, parts of the side frame being broken away to accommodate the figure on the sheet. And Figure 4 is a vertical, sectional view corresponding to the section line 4—4 of Figure 2. In said figures, I have not deemed it necessary to illustrate the entire truck inasmuch as the nature of the invention is clearly indicated by the parts illustrated.

In said drawings, the side frame is indicated broadly generally by the reference character A; the bolster at B; the transom casting at C; the spring plank at D; and the elliptic springs at E.

The side frames, as shown, are of the cast type having integrally formed upper arch bar 10; lower arch bar 11; integrally formed journal boxes 12; and vertical columns 13—13. The arch bars and other sections of the side frame are illustrated of U-cross-section as best shown in Figures 1 and 2 in order to provide great strength for given weight of material. In the side frames arranged and constructed as indicated, it is evident that a large central opening 14 is left in each side frame, which opening is defined on its upper edge by the upper arch bar 10; on its sides by the columns 13 and at the bottom by the horizontally extending section 11$^a$ of the lower arch bar.

Extending from side frame to side frame and cooperable therewith is the transom casting C. The latter comprises two spaced elongated beams 15—15 which extend from one side of the truck to the other, said beams 15—15 being arranged parallel at their outer ends as indicated at 15$^a$, thence diverging as indicated at 15$^b$ until the center line is reached and thence converging and parallel on the opposite end as will be clear from an inspection of Figure 1. The two main horizontal beams 15—15 are connected at their respective ends by a vertically disposed, open, rectangular section as best illustrated in Figure 3. Each of said end sections includes: a top connecting portion 16 formed integrally with the upper inner surfaces of the ends of the beams 15—15; the end portions 17—17 of the beams 15—15; the vertically disposed side arm 17$^a$—17$^a$; and a horizontal bottom connecting member 18. The top connecting portion 16 is of inverted U-shaped cross section, while the bottom connecting portion 18 is U-shape in cross section. The arms 17$^a$—17$^a$ each comprises a vertically extending web formed integrally with the inner bottom edges of the end portions 17—17 of the beams 15—15, and each web is provided with spaced reinforcing flanges 17$^c$ at the opposite edges thereof, said arms at the lower ends being integrally connected with the bottom member 18. The arms 17$^a$—17$^a$ are also connected with the under surfaces of the beams 15—15 by longitudinally extending webs 15$^c$—15$^c$.

The bottom connecting member 18 of the end section is adapted to rest directly upon the portion 11$^a$ of the lower arch bar, and is interlocked with the latter by means of an integrally formed, hollow, depending boss 18ª, which enters the space between the side arms of the U-section of the arch bar. The outer side faces of the end portions 17—17 of the beams 15—15 extend vertically, and the flanges 17ᶜ of the arms 17ª—17ª are inclined inwardly as indicated at 17ᵇ to conform to the contour of the columns 13 as clearly indicated in Figure 3. The inner faces of the end portions 17—17 of the beams 15—15, of the arms 17ª—17ª, and of the upper and lower connecting parts 16 and 18 are straight so as to leave a rectangular opening 19, as best shown in Figure 3. The size of each rectangular end section of the transom casting is such that it may be entered within the opening 14 of the side frame and then dropped down so as to inter-engage the boss 18ª with the lower arch bar. Further, it will be noted from an inspection of Figure 1, that the horizontally extending beams 15—15 of the transom casting C are shouldered as indicated at 15ᵈ so as to co-operate with the columns 13 of the side frame and thus prevent tilting of the side frame inwardly at its top with reference to the transom casting.

The bolster B is of the cast type but, as will be obvious, may be of any desired design. It is provided with the usual center plate 21 and bearing plate sections 22 for the usual side bearings. The bolster is supported at its ends on a pair of elliptical springs E, and in order to maintain the latter properly aligned with the bolster, the bolster is preferably provided with a depending pair of lugs 23—23 on each side of the pair of springs E, and with a centrally disposed pair of lugs 23ª, the lugs 23—23 being adapted to engage the outer surfaces of the springs E, and to straddle the usual holding bands indicated at 24, while the central pair of lugs 23ª are disposed between the inner surfaces of the springs E and straddle the inner ends of both of the bands 24. With this arrangement, the bolster is interlocked with the elliptical springs against movements either lengthwise of the bolster or transversely of the bolster.

The spring plank D, shown of the usual channel cross-section, is supported through the intermediary of the hanger links 25—25 and cross-key 26, the hanger links 25 being pivotally supported from the beams 15 of the transom casting by pins 27 engaging suitable bearings provided in the casting, the beams of the latter being suitably slotted as indicated at 28 to permit the links 25 to pass vertically therethrough. The key 26 supports a spring plank bearing casting 29 which, as shown best in Figure 4, is provided with a pair of upstanding lugs 30, adapted to be extended through correspondingly located perforations in the spring plank D. Said lugs 30 are adapted to enter correspondingly located openings in a cast spring seat 31, the latter being provided with sets of upstanding lugs 32—32 and 33 corresponding to the bolster lugs 23 and 23ª and co-operable with the lower sections of the eliptical springs E and their bands to maintain the springs in alignment and to prevent sidewise tilting about their vertical axes in a horizontal plane, and longitudinal shifting of the springs with reference to the spring seat.

It frequently becomes necessary to adjust the height of the bolster relative to the side frame to compensate for set in the springs or to compensate for variations in the springs as initially made and to compensate for various other differences that may occur in the manufacture of the parts. For this purpose, I employ shims 33ª, which are perforated to fit the lugs 30 of the plank support 29 so that a very simple arrangement is thus provided for interlocking the spring plank and the spring seat and at the same time providing for vertical adjustment of the springs and hence of the bolster. It will be obvious, by introducing more or less shims, that the desired height can be effected and this without the aid of any bolts, rivets or other like devices.

With the construction of transom C, as shown, it will be observed that the ends of the elliptical springs E are adapted to project through the opening 19 of the vertical end section of the transom casting, thus giving ample space in the truck for the spacing of the springs E and providing for the use of a long spring plank. It will further be noted that no bolts, rivets or other fastening devices of like character are required in the assembling and maintaining assembled, of the various parts entering into my improved truck.

Although I have herein shown and described what I now consider the preferred manner of carrying out my invention, the same is merely illustrative and I contemplate all changes and modifications that come within the scope of the claims appended hereto.

I claim:

1. In a truck, the combination with separate side frames having central openings; of a transom having its ends detachably received in said openings and resting upon the lower arch bars of said side frames; and a bolster swingingly suspended from said transom for motion in a direction transversely of the truck and spring supported thereby.

2. In a truck, the combination with the side frames having central openings; of a cast transom having the ends thereof received in said center openings of the side frames the ends of said transom each having a center opening; a spring plank suspended from said transom; a bolster; and elliptic springs interposed between said plank and bolster, portions of said springs being extended outwardly through said central openings of the transom and side frames.

3. In a truck, the combination with side frames; of a cast transom, the ends of the latter having integral means detachably interlocked with said side frames and resting on the lower arch bars thereof; and a spring plank supported by said transom.

4. As an article of manufacture, a cast transom for trucks comprising: two longitudinally extending beams having a connecting member at their ends, and two spaced arms at each end of said transom extending away from said connecting member at an angle to the plane in which said beams lie, said arms being joined at their ends remote from said connecting member.

5. As an article of manufacture, a transom for trucks comprising: a casting having end sections of hollow, rectangular formation and spaced beams connecting said rectangular sections, each of said sections including arms extending to one side of the plane in which said beams lie, and said beams having bearings for the accommodation of swing hanger links formed therein.

6. As an article of manufacture, a transom for trucks comprising: a casting having longitudinally extending spaced beams, and an angularly disposed hollow rectangular section at each end, said beams diverging from their ends toward the center and adapted to accommodate a bolster therebetween.

7. In a truck, the combination with the side frames, the latter having upper and lower bars and spaced columns therebetween; of a cast transom having approximately rectangular end sections extending vertically below the plane of the body of the transom, the end sections being received in the spaces between the respective sets of columns of the side frames; and a bolster swingingly supported by said transom.

8. As an article of manufacture, a cast transom for a truck, said transom comprising elongated spaced beams of hollow cross-section and angularly disposed end sections, the latter being of approximately rectangular outline.

9. In a truck, the combination with side frames having centrally disposed openings therein; of a transom member extending from side frame to side frame, said transom member having vertically disposed end portions adapted to be received in said openings of the side frames; means for detachably inter-locking said transom member and side frames; a bolster; and means for yieldingly hanging said bolster from said transom member.

10. In a truck, the combination with a spring plank; of means for suspending said spring plank for swinging motion including a spring plank bearing member providing a hanger link seat and having an upstanding projection extended through a perforation in the plank; and a spring seat having a perforation to accommodate said projection whereby all of said parts may be held in assembled but detachable condition.

11. In a truck, the combination with a spring plank; of means for mounting said spring plank for swinging motion including a spring plank bearing member having a seat for the swinging mounting and provided with an upstanding projection extended through a perforation in the plank; a spring seat on said plank having a perforation to accommodate said projection whereby all of said parts may be held in assembled but detachable condition; and a perforated shim detachably interposed between said spring plank and spring seat.

12. In a truck, the combination with separate side frames having central openings; of a transom having approximately rectangular vertical end sections depending below the plane of the body of the transom, the end section being received in the openings in said side frames; spring means supported by said transom below the intermediate portion of the same; and a bolster supported by said springs.

13. In a truck, the combination of side frames having openings therethrough, a transom having its ends extended through said openings and rigidly supported within said openings by the side frames, a bolster, and leaf springs suspended from and lying below said transom and underlying and supporting said bolster.

14. In a truck, the combination of side frames having openings therethrough, a transom having its ends extended through said openings and rigidly supported within said openings by the lower arch bars of the side frames, a bolster, and leaf springs suspended from and lying below said transom and underlying and supporting said bolster.

15. In a truck, the combination of side frames having openings therethrough, a transom having its ends extended through said openings and supported within said openings by the side frames, a bolster, and leaf springs suspended from and lying below said transom and underlying and supporting said bolster, each of said leaf springs extending outwardly through the opening in the proximate side frame and extending beyond the proximate end of the transom.

16. In a truck, the combination of side frames having openings therethrough, a transom having its ends extended through said openings and supported within said openings by the lower arch bars of the side frames, a bolster, and leaf springs suspended from and lying below said transom and underlying and supporting said bolster, each of said leaf springs extending outwardly through the opening in the proximate side frame and extending beyond the proximate end of the transom.

17. In a truck, the combination of side frames having tension and compression members and guide columns forming openings in said frames, a transom member extending through the planes of said side frames and supported by said frames, a spring plank suspended from said transom, elliptic springs disposed longitudinally of said transom on said spring plank and extending through the openings in said side frames, and a bolster mounted at its ends on said springs.

18. In a truck, the combination of side frames having tension and compression members and guide columns forming openings in said frames, a transom member extending through the planes of said side frames and supported by said frames, and comprising beam members spaced apart and connected by cross members at its ends, a spring plank suspended from said transom, elliptic springs disposed longitudinally of said transom on said spring plank and extending through the openings in said side frames, and a bolster mounted at its ends on said springs and positioned between said spaced beams of the transom substantially in the plane thereof.

19. In a truck, the combination of side frames having guide members, a transom having members cooperating with said guide members and defining an opening, a bolster, a spring plank, means for movably supporting said spring plank from said transom, and means interposed between said spring plank and bolster and extending between said guide members and second named members for resiliently supporting said bolster.

20. In a truck, the combination of trussed side frames having upper and lower chords, spaced U-shaped column guides between said chords, transoms, transom yokes having means engaging said guides, a bolster, a spring plank, swing hangers pivotally secured to said transoms and spring plank, and springs disposed between said bolster and spring plank and disposed to partially project beyond said frames between the transom yokes.

21. In a truck, the combination of side frames having upper and lower chords, spaced column guides between said chords, transoms having columns cooperating with said guides, a bolster, a spring plank, swing hangers pivotally secured to said transoms and spring plank, and springs disposed between said bolster and spring plank and partially projecting beyond said frames between the column guides.

22. In a transom, the combination of spacer members provided with end connecting members, said first named members having parallel portions adjacent said end connecting members, and portions adjacent the center of said transom, said last named portions being spaced apart a greater distance than said parallel portions, said portions of each of said spaced members being connected by members diverging toward said second named portions.

23. In a truck, the combination of trussed side frames having upper and lower chords, spaced U-shaped columns between said chords, transoms, transom yokes having means engaging said columns, means supporting said transoms on said lower chords, a bolster, a spring plank, swing hangers pivotally secured to said transoms and spring plank, and springs disposed between said bolster and spring plank and disposed to partially project beyond said frames between the transom yokes.

In witness that I claim the foregoing I have hereunto subscribed my name this 13th day of July 1927.

KARL M. HAMILTON.